United States Patent [19]

Shaw et al.

[11] Patent Number: 4,471,481

[45] Date of Patent: Sep. 11, 1984

[54] AUTONOMOUS TERMINAL DATA COMMUNICATIONS SYSTEM

[75] Inventors: John L. Shaw, Renton; Hans K. Herzog, Bellevue, both of Wash.

[73] Assignee: The Boeing Company, Seattle, Wash.

[21] Appl. No.: 278,494

[22] PCT Filed: Feb. 11, 1981

[86] PCT No.: PCT/US81/00182

§ 371 Date: Feb. 11, 1981

§ 102(e) Date: Feb. 11, 1981

[87] PCT Pub. No.: WO82/02809

PCT Pub. Date: Aug. 19, 1982

[51] Int. Cl.³ .............................................. H04J 6/00
[52] U.S. Cl. ..................................... 370/85; 370/101; 370/93; 340/825.5
[58] Field of Search ..................... 370/85, 92, 101, 91, 370/96, 108, 93, 94; 340/825.5

[56] References Cited

U.S. PATENT DOCUMENTS

| | | | |
|---|---|---|---|
| 4,052,566 | 10/1977 | MacKay | 179/15 |
| 4,053,714 | 10/1977 | Long | 179/15 |
| 4,156,112 | 5/1979 | Moreland | 179/15 |
| 4,177,450 | 12/1979 | Sarrand | 340/147 |
| 4,199,663 | 4/1980 | Herzog | 370/85 |
| 4,395,710 | 7/1983 | Einolf et al. | 340/825.5 |

FOREIGN PATENT DOCUMENTS 2442736 12/1976 Fed. Rep. of Germany.
2006491 5/1979 United Kingdom.

OTHER PUBLICATIONS

3rd USA–Japan Computer Conference Proceedings, 1978, Christensen et al., Design and Analysis of the Access Protocol for Hyperchannel Networks.

Primary Examiner—Douglas W. Olms
Attorney, Agent, or Firm—Christensen, O'Connor, Johnson & Kindness

[57] ABSTRACT

A data communications system which includes a plurality of terminals $TL_1$–$TL_5$) and a data bus (DB), wherein each of the terminals has autonomous access to the data bus. Each terminal includes a receiver (114) which is normally enabled to receive messages on the data bus and which provides a signal (ADA) signifying the absence of messages. A transmitter (120) within each terminal includes a protocol control unit (140) which enables the transmitter to initiate message transmission only upon (i) the detection of an absence of messages on the data bus whose duration substantially equals that of a sync gap that is common to all of the terminals, and (ii) the subsequent detection of an absence of messages on the data bus whose duration substantially equals that of a terminal gap that is unique to the terminal, with the duration of the sync gap being greater than the duration of any terminal gap. Within each protocol control unit, the sync gap is detected by a sync gap timer (160, 162, 164, 166, and 168) and the terminal gap is detected by a termial gap timer (190, 192, 194, 196, and 198) which is enabled (169) by the sync gap timer, with both timers being responsive to signal ADA. In order to limit the rate of message transmission by any terminal, each protocol control unit may also include a transmission interval timer (170, 172, 174, 176, and 178) which enables message transmission only upon the further condition that (iii) a transmission interval has elapsed from a previous message transmission by the terminal, with the duration of the transmission interval being substantially the same for each terminal.

25 Claims, 10 Drawing Figures

AUTONOMOUS TERMINAL DATA COMMUNICATIONS SYSTEM

FIELD OF THE INVENTION

This invention generally relates to the field of data communications, and, more particularly, to a system providing data communications among a plurality of terminals over a common data communications medium, with each terminal having autonomous access to the data communications medium independent of any other terminal or device.

BACKGROUND OF THE INVENTION

In U.S. Pat. No. 4,199,663, Autonomous Terminal Data Communications System, Herzog, issued Apr. 22, 1980 to the assignee of the present invention, a data communications system is described which permits each of a plurality of terminals to periodically transmit messages on a data communications medium such as a data bus, with the message transmissions by each terminal being autonomous with respect to the message transmissions by any other terminal. A message transmission by a terminal is permitted only when a certain protocol is satisfied. The protocol requires, inter alia, that there be an absence of messages on the data communications medium for a time substantially equal to that of an intermessage or "terminal" gap unique to the terminal, and, that a predetermined transmission interval, from a previous message transmission by the terminal, have elapsed. The transmission intervals of all terminals each have substantially the same duration which is greater than the sum of all terminal gaps and of the durations of all messages transmitted by the plurality of terminals since a previous message transmission by any terminal.

Although such a system is advantageous in permitting each participating terminal to have autonomous access for the purpose of message transmissions to the data communications medium so that a central bus controller to regulate message transmissions is not required, in permitting a significant reduction to be made in the wiring requirements between participating terminals, and in permitting a significant increase in the reliability of the data communications system, the requirement for periodic message transmissions by a terminal is disadvantageous in some respects. For example, once having transmitted a message on the data communications medium, a terminal must wait until its transmission interval elapses before initiating another message transmission. If the data communications system is designed for a large number of participating terminals and only a few of the participating terminals are engaged in message transmissions, it will be seen that the requirement for the elapse of a fixed transmission interval limits the rate at which any terminal can successively engage in message transmissions and also results in the data communications medium being silent and therefore under-utilized for a significant portion of time.

Another requirement of the protocol in U.S. Pat. No. 4,199,663 is that successive messages from any terminal must be substantially equal in duration in order to maintain the periodicity of message transmissions by that terminal. Accordingly, if a large amount of data is present at one terminal for transmission to other terminals, the requirement for a fixed message duration may well dictate that only a portion of that data be transmitted at one given time and that succeeding portions of that data be transmitted upon the elapse of successive transmission intervals.

In certain applications of the data communications system in modern aircraft, the requirement for periodic transmissions of substantially fixed-duration messages is ideally matched to the requirements of the avionic system using the data communications system. For example, the avionic system may comprise a closed-loop servo system in which a transmitting terminal transmits data obtained from a sensor and in which a utilization device associated with a receiving terminal acts upon the data transmitted by the transmitting terminal to effect certain control functions. In such an application, periodic message transmissions are required so that the control actions effected by the utilization device have a predetermined time relationship to the data from the sensor. However, there are certain other aircraft systems, such as a monitoring and display system, in which the requirement for periodic message transmissions may result in degradation of system operation. In a typical monitoring and display system, certain subsystems associated with a plurality of transmitting terminals each accumulate a large block of data which should be transmitted as a unit to a receiving terminal associated with a utilization device providing centralized monitoring and display functions. Further, the time period of accumulation of data by any such subsystem, and the amount of data in any such block, may be variable. Therefore, if the data communications system is capable of permitting any terminal to engage only in periodic transmissions of substantially fixed-duration messages, and if one of the subsystems is ready to transfer a variable block of data at a time when other subsystems are not ready for data transmission, it will be seen that the block of data from the "data ready" subsystem may not be transmitted as a unit, that the rate of data transmission may be limited, and that the data communications medium may be silent for a substantial period of time.

It is therefore an object of this invention to provide an improved autonomous terminal data communications system.

It is a further object of this invention to provide such a communications system which permits each terminal to engage in aperiodic message transmissions on the data communications medium.

It is yet a further object of this invention to provide such a data communications system which also permits each terminal to engage in variable-length message transmissions on the data communications medium.

It is still a further object of this invention to provide such a data communications system which also permits each terminal to engage in periodic data transmissions on the data communications medium.

It is another object of this invention to provide such a data communications system which permits each terminal to engage in either aperiodic or periodic message transmissions on the data communications medium, depending on the condition of message transmissions by other terminals in the system.

It is yet another object of this invention to provide such a data communications system which provides optimum utilization of the data communications medium under all conditions of message transmissions by the participating terminals of the system.

SUMMARY OF THE INVENTION

The foregoing objects, and other objects and advantages that will be apparent to those of ordinary skill in the art, are achieved by the use of a method which permits a plurality of terminals to autonomously transmit messages on a data communications medium. At each terminal, the absence of messages on the data communications medium is detected. Transmission of a message by a terminal is enabled, however, only upon of (i) an absence the detection of messages on the data communications medium whose duration substantially equals that of a sync gap that is common to all of the plurality of terminals, and (ii) the subsequent detection of an absence of messages on the data communications medium whose duration substantially equals that of a terminal gap that is unique to the terminal, with the duration of the sync gap being greater than the duration of any terminal gap.

In most situations, the use of this method would result in aperiodic message transmissions by any terminal, with the rate of message transmissions by any terminal being dependent on the number of terminals that are transmitting messages and upon the length of these messages. In order to limit the rate of message transmission by any terminal in the situation where only a few of the terminals are actually transmitting messages, transmission of a message by a terminal may be enabled only additionally upon the elapse of a transmission interval, from a previous transmission of a message by the terminal, with the transmission interval having a predetermined duration which is substantially the same for all of the plurality of terminals.

BRIEF DESCRIPTION OF THE DRAWINGS

The invention can best be understood by reference to the following portion of the specification, taken in conjunction with the accompanying drawings, in which.

DESCRIPTION OF A PREFERRED EMBODIMENT

Figure 1:
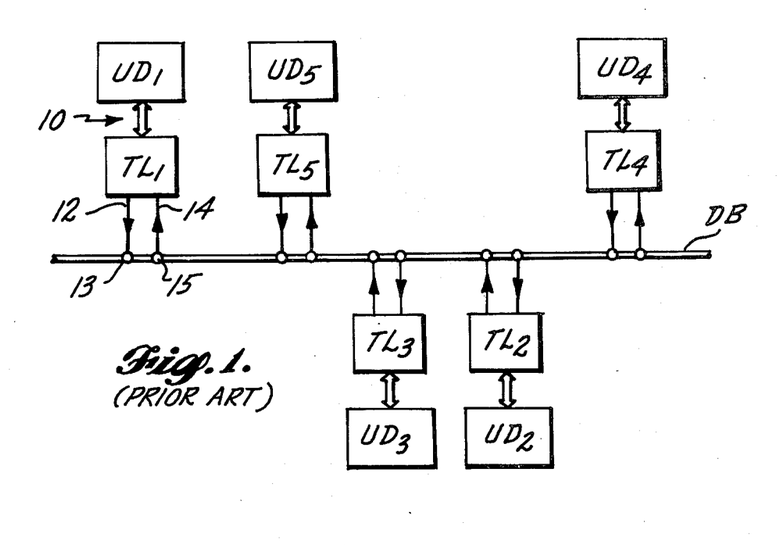
FIG. 1 is a block diagram of a data communications system known to the prior art which uses a data bus and which has a plurality of participating terminals coupled to the data bus.

With reference now to FIG. 1, the data communications system illustrated therein is adapted to provide data communications among a plurality of utilization devices $UD_1$-$UD_5$. In practical applications, the utilization devices $UD_1$-$UD_5$ may comprise a plurality of avionic systems, or subsystems, or, a plurality of computer-related devices such as a central processing unit (CPU), input/output (I/O) devices, displays, memories, or the like. Each of the utilization devices $UD_1$-$UD_5$ may include means for transmitting data, means for receiving data, or both. The data communications system includes a plurality of terminals $TL_1$-$TL_5$ which are associated with respective ones of the utilization devices $UD_1$-$UD_5$, and also includes a common data communications medium to which the plurality of terminals $TL_1$-$TL_5$ are coupled. In the embodiment shown in FIG. 1 and as discussed hereinafter, the data communications medium comprises a data bus DB, which may take many forms, such as one or more electrical conductors, a magnetic member, a wave guide, or a fiber-optic member. It is not required, however, that the data communications medium be limited to a physical apparatus such as data bus DB, so that the data communications medium may comprise any appropriate carrier, such as audio, radio or light frequency waves or pulses, which is capable of carrying information by way of modulation thereof.

In FIG. 1, each terminal includes a data commuications link 10 for exchanging data with its associated utilization device, an output 12 upon which transmitted data appears and which is coupled to the data bus DB by a bus coupler 13, and an input 14 for receiving data present on the data bus DB, with the input 14 being coupled to the data bus DB by a bus coupler 15. Preferably, the data bus DB includes a single twisted pair of wires extending to the physical locations of the utilization devices $UD_1$-$UD_5$, and bus couplers 13 and 15 each includes separable core elements that are adapted to be inserted into adjacent loops of the twisted pair of wires, all as described in U.S. Pat. No. 4,264,827, issued Apr. 28, 1981, Current Mode Data Or Power Bus, Herzog, which is assigned to the assignee of the present invention. In the embodiment shown in FIG. 1 and discussed hereinafter, the data to be transmitted and received using the data bus DB is in the form of messages comprising one or more successive serial digital words.

Figure 2:
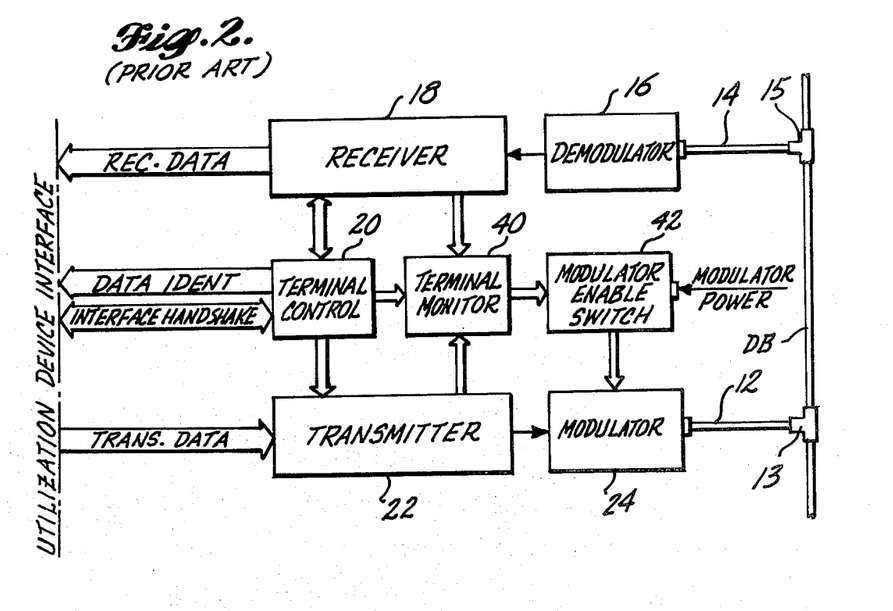
FIG. 2 is a block diagram of a typical participating terminal, as known to the prior art.

Referring now to FIG. 2, each terminal includes a demodulator 16 for demodulating the messages on the data bus DB which are received via coupler 15 and input 14 and for supplying the demodulated messages to a receiver 18. The demodulated messages are temporarily stored within the receiver 18, and the data therein is sent in an appropriate format to the associated utilization device under control of a terminal control unit 20 which exchanges "interface handshake" information with the utilization device and which provides the utilization device with an identification of the data that has been received. A transmitter 22 receives data from its associated utilization device, again under control of the terminal control unit 20, and outputs such data in the form of messages comprising one or more successive, serial digital words at times determined by the terminal control unit 20. A modulator 24 modulates the messages in a desired manner and supplies the modulated messages to the data bus DB via the output 12 and coupler 13.

Normally, the receiver 18 in each terminal is enabled and the transmitter 22 is disabled. The terminal control units 20 in the plurality of terminals $TL_1$-$TL_5$ utilize an identical and unique terminal control routine, or protocol, which ensures that only one terminal is transmitting at a given time.

To this point, the data communications system as described is substantially identical to that described in U.S. Pat. No. 4,199,663. The specific protocol in that patent, hereinafter referred to as the A-mode protocol, also ensures that, under steady-state conditions, transmissions by any terminal occur at periodic transmission intervals.

In detail, the A-mode protocol requires that: (a) the transmission interval for each terminal be the nominal time interval between the initiation of periodic data transmissions by the terminal, and that the transmission intervals for all terminals be substantially the same in duration; (b) each transmitting terminal be capable of transmitting one message, including one or more data words, with appropriate synchronizing, label, parity and other information during each transmission interval; (c) each message can have any desired duration so long as such duration is fixed during times when periodic transmissions by the terminal are required and so long as the sum of the durations of the messages of all terminals, and all intermessage gaps, plus a growth gap required to accomodate additional terminals, does not exceed the duration of any transmission interval; (d) each transmitting terminal initiates a message transmission only upon occurrence of the expiration of an intermessage or "terminal" gap on the data bus which is unique to that transmitting terminal, and, the elapse of a period of time, from a previous message transmission by the terminal, which is substantially equal to the transmission interval; and (e) any interword gaps in any message have a duration which is less than that of the shortest terminal gap.

Because the A-mode protocol is specifically designed for periodic message transmissions, use of this protocol in a data communications system of the type shown in FIG. 1 limits the manner in which message transmissions may be made. For example, the rate of successive message transmissions by any terminal is limited by the duration of the transmission interval. If only a few of the terminals (e.g., terminals $TL_1$ and $TL_2$) are engaging in message transmissions, it will be seen that the data bus DB is silent for a substantial portion of time (e.g., that during which terminals $TL_3$-$TL_5$ would otherwise be engaging in message transmissions) so that the data bus is not utilized in an optimum manner. Further, the requirement that the sum of the durations of the messages of all terminals, of all terminal gaps, and of the growth gap does not exceed the duration of any transmission interval limits the number of transmitting terminals that can be added to the data communication system unless the growth gap is made sufficiently long in duration, in which case the rate of successive message transmissions by any terminal is further limited. Finally, the requirement that successive messages by any terminal have a constant duration or length limits the amount of data that can be transmitted by any terminal at any point in time.

In order to avoid these limitations in applications of the data communications system where periodic message transmissions are not required, each terminal control unit 20 may also implement a second, or B-mode, protocol which requires that: (a) each transmitting terminal initiates a message transmission only upon (i) the detection of an absence of messages on the data bus whose duration substantially equals that of a sync gap that is common to all terminals and (ii) the subsequent detection of an absence of messages on the data bus whose duration substantially equals that of a terminal gap unique to the terminal; (b) the duration of the sync gap must be longer than that of any terminal gap; and, (c) any interword gaps in any message have a duration which is less than that of the shortest terminal gap.

Figure 4:
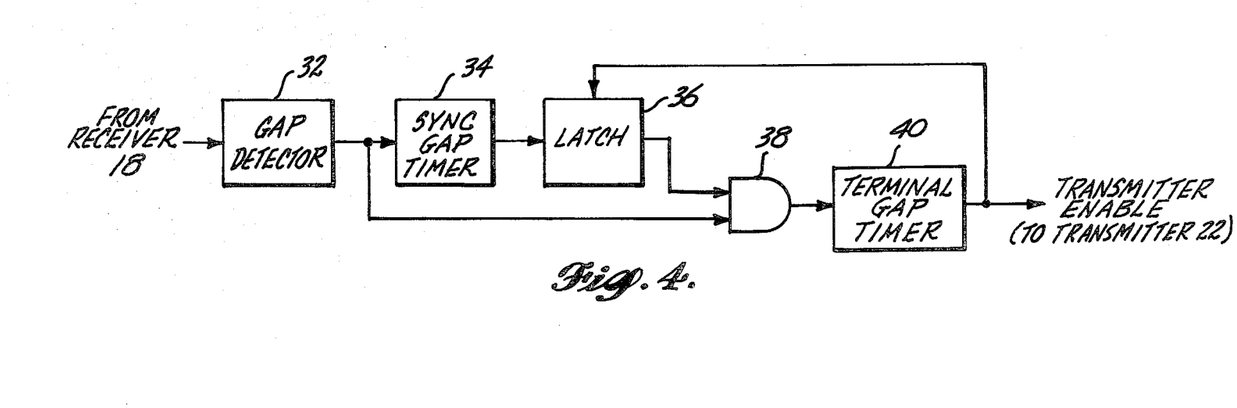
FIG. 4 is a block diagram of a portion of a terminal control unit in FIG. 2 that is particularly adapted to implement the protocol illustrated in FIG. 3.

The requirements of the B-mode protocol can be embodied in each terminal control unit 20 by the use of circuitry such as illustrated in FIG. 4. A gap detector 32 receives the demodulated messages from the receiver 18 and provides an output signal only when such demodulated messages are absent. A sync gap timer 34 is adapted to time the duration of each output signal from gap detector 32 and provides a momentary output signal only when the duration of any output signal from gap detector 32 is substantially equal to the sync gap common to all terminals. If an output signal from gap detector 32 terminates before expiration of the sync gap, timer 34 is internally reset. Any output signal from sync gap timer 34 sets a latch 36 which responsively provides an output signal to enable an AND gate 38 to pass any output signal from gap detector 32 to a terminal gap timer 40. Therefore, when AND gate 38 is enabled, condition (i) of the B-mode protocol has been satisfied and terminal gap timer 40 thereafter times the duration of each output signal from gap detector 32. When the duration of any output signal from gap detector 32 thereafter exceeds the unique terminal gap assigned to the terminal, both conditions (i) and (ii) of the B-mode protocol have been satisfied, whereupon terminal gap timer 40 provides a momentary transmitter enable signal to the transmitter 22 so that transmitter 22 may transmit a message on the data bus DB. If an output signal from gap detector 32 terminates before expiration of the terminal gap, timer 40 is internally reset. The transmitter enable signal also resets latch 36, thereby disabling AND gate 38. As a result, terminal gap timer 40 is not thereafter supplied with any output signals from gap detector 32 until the absence of messages on the data bus again exceeds the sync gap and sync gap timer 34 again provides an output signal.

Figure 3:
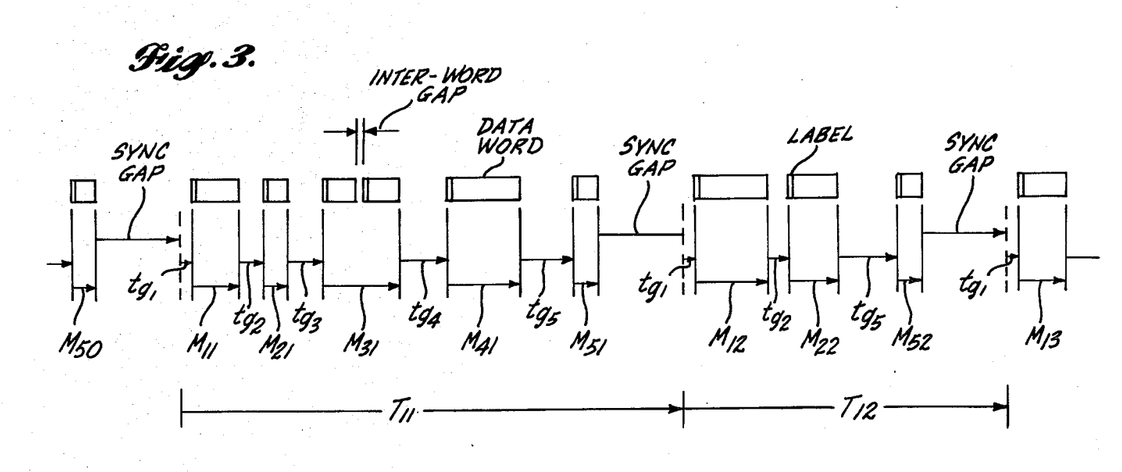
FIG. 3 is a timing diagram illustrating the operation of the data communications system under control of an aperiodic, variable-length message protocol.

To more fully understand the operation of the data communications system under the B-mode protocol, reference should be made also to FIG. 3 which comprises a timing chart illustrating a plurality of successive cycles of operation of the data communications system.

Terminals $TL_1$-$TL_5$ are each capable of transmitting messages, with each message including one or more data words, each data word being of a variable length and being preceded by a label identifying the data therein. In the case of a multiple data word message, the data words are separated by an interword gap. The cycles of operation illustrated in FIG. 3 include successive cycles $T_{11}$ and $T_{12}$. In cycle $T_{11}$, each of the terminals $TL_1$-$TL_5$ transmits a message, that is, terminals $TL_1$, $TL_2$, $TL_3$, $TL_4$ and $TL_5$ respectively transmit messages $M_{11}$, $M_{21}$, $M_{31}$, $M_{41}$, and $M_{51}$. Messages $M_{11}$, $M_{21}$, $M_{41}$ and $M_{51}$ each include a single data word, with the data words being of variable length, and message $M_{31}$ includes two data words of equal length that are separated by an interword gap. In cycle $T_{12}$, only terminals $TL_1$, $TL_2$ and $TL_5$ transmit messages, these being messages $M_{12}$, $M_{22}$ and $M_{52}$, respectively. Each message in cycle $T_{12}$ includes a single data word, with the data words being of variable length. Further, it will be noted that the durations of messages $M_{12}$ and $M_{22}$ are different from the corresponding durations of messages $M_{11}$ and $M_{21}$. As illustrated, cycle $T_{11}$ is preceded by message $M_{50}$ from terminal $TL_5$, and cycle $T_{12}$ is succeeded by message $M_{13}$ from terminal $TL_1$.

The terminal control unit 20 in each of the terminals $TL_1$–$TL_5$ establishes (through its terminal timer 40) a unique terminal gap for the associated terminal. That is, gaps $tg_1$, $tg_2$, $tg_3$, $tg_4$ and $tg_5$ for terminals $TL_1$, $TL_2$, $TL_3$, $TL_4$ and $TL_5$, respectively (with $tg_1 < tg_2 < tg_3 < tg_4 < tg_5$). The terminal control unit 20 in each of the terminals $TL_1$–$TL_5$ also establishes (through its sync gap timer 34) a sync gap that is common to all terminals.

Let it be assumed that at the termination of message $M_{50}$, all latches 36 have been reset. Thereafter, the absence of messages on the data bus cause the sync gap timer 34 in each of terminals $TL_1$–$TL_5$ to begin timing. After the expiration of a time equal to the sync gap, each sync gap timer 34 provides an output signal which sets its associated latch 36. As a result, each of the AND gates 38 is enabled so that each of the terminal gap timers 40 begins timing to initiate cycle $T_{11}$. After the expiration of a time equal to terminal gap $tg_1$, the terminal gap timer 40 in terminal $TL_1$ provides a transmitter enable signal which causes the transmitter in terminal $TL_1$ to initiate transmission of message $M_{11}$ and which resets the latch 36 in terminal $TL_1$ to accordingly disable the AND gate 38 in terminal $TL_1$ so as to disable the terminal gap timer 40 therein. A successive message transmission from terminal $TL_1$ therefore cannot be made until the detection of a successive sync gap. In terminals $TL_2$–$TL_5$, latch 36 remains set to signify that the sync gap has been detected and that no message transmission has yet been made by those terminals. The initiation of message $M_{11}$ also causes the gap detector 32 in each of the terminals to terminate its output signal, whereby all of the sync gap timers 34 and the terminal gap timers 40 stop timing (and ae internally reset).

At the termination of message $M_{11}$, the terminal gap timers 40 in terminals $TL_2$–$TL_5$ again begin timing. After the expiration of a time equal to terminal gap $tg_2$, the terminal gap timer 40 in terminal $TL_2$ provides a transmitter enable signal which causes the transmitter in terminal $TL_2$ to initiate transmission of message $M_{21}$ and which resets the latch 36 in terminal $TL_2$. As can be appreciated, the terminal gap timers in terminals $TL_3$–$TL_5$ stop timing (and are reset) at the initiation of message $M_{21}$, but the latches 36 therein remain set.

It will be seen that upon the successive absences of messages equal to terminal gaps $tg_3$, $tg_4$ and $tg_5$, terminals $TL_3$, $TL_4$ and $TL_5$ successively transmit messages $M_{31}$, $M_{41}$ and $M_{51}$. Since the interword gap between the successive data words in message $M_{31}$ is chosen to be shorter than any terminal gap, it will also be seen that the terminal gap timers 40 in terminals $TL_4$ and $TL_5$ do not complete timing following the termination of transmission of the first data word in message $M_{31}$ and the initiation of transmission of the second data word in message $M_{31}$.

At the termination of message $M_{51}$, the latches 36 in all of terminals $TL_1$–$TL_5$ are reset, thereby disabling each of the AND gates 38 so that no terminal gap timer 40 may begin timing. After the expiration of a time equal to the sync gap, each of the sync gap timers 34 provides an output signal which sets its associated latch 36. As a result, all of the AND gates 38 are now enabled and all of the terminal gap timers 40 begin timing to terminate cycle $T_{11}$ and to initiate cycle $T_{12}$. During cycle $T_{12}$, terminals $TL_1$ and $TL_2$ transmit messages $M_{12}$ and $M_{22}$ in a manner similar to that previously described after the successive expiration of terminal gaps $tg_1$ and $tg_2$. Upon termination of message $M_{22}$, the latches 36 in terminals $TL_1$ and $TL_2$ are reset and the latches 36 in terminals $TL_3$–$TL_5$ remain set. As a result, the AND gates 38 in terminals $TL_3$–$TL_5$ remain enabled and the terminal gap timers 40 therein each begin timing at the termination of message $M_{22}$. After a time equal to terminal gap $tg_3$, the terminal gap timer 40 in terminal $TL_3$ provides a transmitter enable signal (which resets the latch 36 therein). However, no message transmission is actually made by terminal $TL_3$ in response to this transmitter enable signal. As a result, the AND gates 38 in terminals $TL_4$ and $TL_5$ remain enabled. After a time (from the termination of message $M_{22}$) equal to terminal gap $tg_4$, the terminal gap timer 40 in terminal $TL_4$ provides a transmitter enable signal (which resets the latch 36 therein). However, no message is actually transmitted by terminal $TL_4$ in response to this transmitter enable signal. As a result, the AND gate 38 in terminal $TL_5$ remains enabled and the terminal gap timer 40 therein continues timing. After the expiration of a time (from the termination of message $M_{22}$) equal to terminal gap $tg_5$, the terminal gap timer 40 in terminal $TL_5$ provides a transmitter enable signal (which resets the latch 36 therein). As a result, the transmitter in terminal $TL_5$ initiates transmission of message $M_{52}$. Upon termination of message $M_{52}$, all latches 36 have been reset and, after the expiration of a time equal to the sync gap, each sync gap timer 34 provides an output signal which sets its associated latch 36 so as to again enable each AND gate 38, whereby cycle $T_{12}$ terminates and a successive cycle is initiated (during which terminal $TL_1$ transmits message $M_{13}$ after expiration of terminal gap $tg_1$, and so forth).

It will be recognized from FIG. 3 that the B-mode protocol can provide substantially periodic transmissions of successive messages from each terminal, provided that the same terminal or terminals are continuously engaged in message transmissions and that the successive messages from any terminal have substantially equal durations. However, it is more likely that the B-mode protocol will provide aperiodic message transmissions, as illustrated in FIG. 3 in which the interval between messages $M_{11}$ and $M_{12}$ (e.g., that of cycle $T_{11}$), is greater than the interval between messages $M_{12}$ and $M_{13}$ (e.g., that of cycle $T_{12}$). The rate of message transmission by any terminal under the B-mode protocol will depend on the number of terminals that are transmitting messages and upon the length of these messages. As the number of transmitting terminals and/or the message lengths increase, the rate of transmission decreases. Likewise, as the number of transmitting terminals and/or the message lengths decrease, the rate of transmission increases. With the B-mode protocol, the data bus DB is utilized in an optimum manner, for it will be seen that the data bus is silent for a maximum time equal to the sum of the sync gap and the longest terminal gap (e.g., $tg_5$), assuming that at least one terminal is transmitting messages, and for a minimum time equal to the sum of the sync gap and the shortest terminal gap (e.g., $tg_1$). Successive messages from any terminal can be of any length, since the B-mode protocol only imposes conditions upon the absence of messages on the data bus. Finally, a data communications system operating under the B-mode protocol can accomodate any number of transmitting terminals without having to reset the transmission intervals or provide an extensive growth gap as with the A-mode protocol, subject to the limitation of a decreasing message transmission rate as previously described.

In certain situations, it may be desirable to implement the A-mode protocol, the B-mode protocol or a combination thereof, to which a specific reference will be made in conjunction with the description of the protocol control unit in FIGS. 7, 8, 9A and 9B.

Since the receivers 18 in each of the terminals $TL_1$-$TL_5$ are continuously enabled, it can be seen that the messages on data bus DB can be detected by any of the participating terminals and transferred, upon proper identification, to their associated utilization device.

In order that only one terminal be in a transmitting mode at any one time, it is essential that the B-mode protocol be strictly adhered to. Therefore, it is necessary that the sync gap timers 34 and the terminal gap timers 40 in all of the terminals have a stable time base so that the sync gap does not become shorter than the terminal gap of any terminal and so that the terminal gap of any terminal does not approximate that of any other terminal. Finally, the time base establishing the interword gap in each of the terminals must be stable so that the interword gap of any terminal does not equal or exceed any terminal.

In order to monitor adherence to the B-mode protocol, each terminal includes a terminal monitor 40 (FIG. 2) which receives signals from the receiver 18, the terminal control unit 20, and the transmitter 22 therein. Each terminal monitor 40 includes an independent time base which establishes the desired interword gap, terminal gap, and sync gap for its associated terminal. The terminal monitor 40 also includes circuitry for comparing the actual interword gap, terminal gap and sync gap provided by the timers in its associated terminal control unit (such as sync gap timer 34 and terminal gap timer 40) with the desired interword gap, terminal gap and sync gap established by the independent time base therein. If any of these comparisons fail to be made, the terminal monitor 40 supplies a signal to a modulator enable switch 42 which responsively removes power from the modulator 24 to inhibit further transmissions by the associated terminal.

To further illustrate the operation of the data communications system, reference will now be made to the construction and operation of a simplified version of each terminal $TL_1$-$TL_5$.

Figure 5:
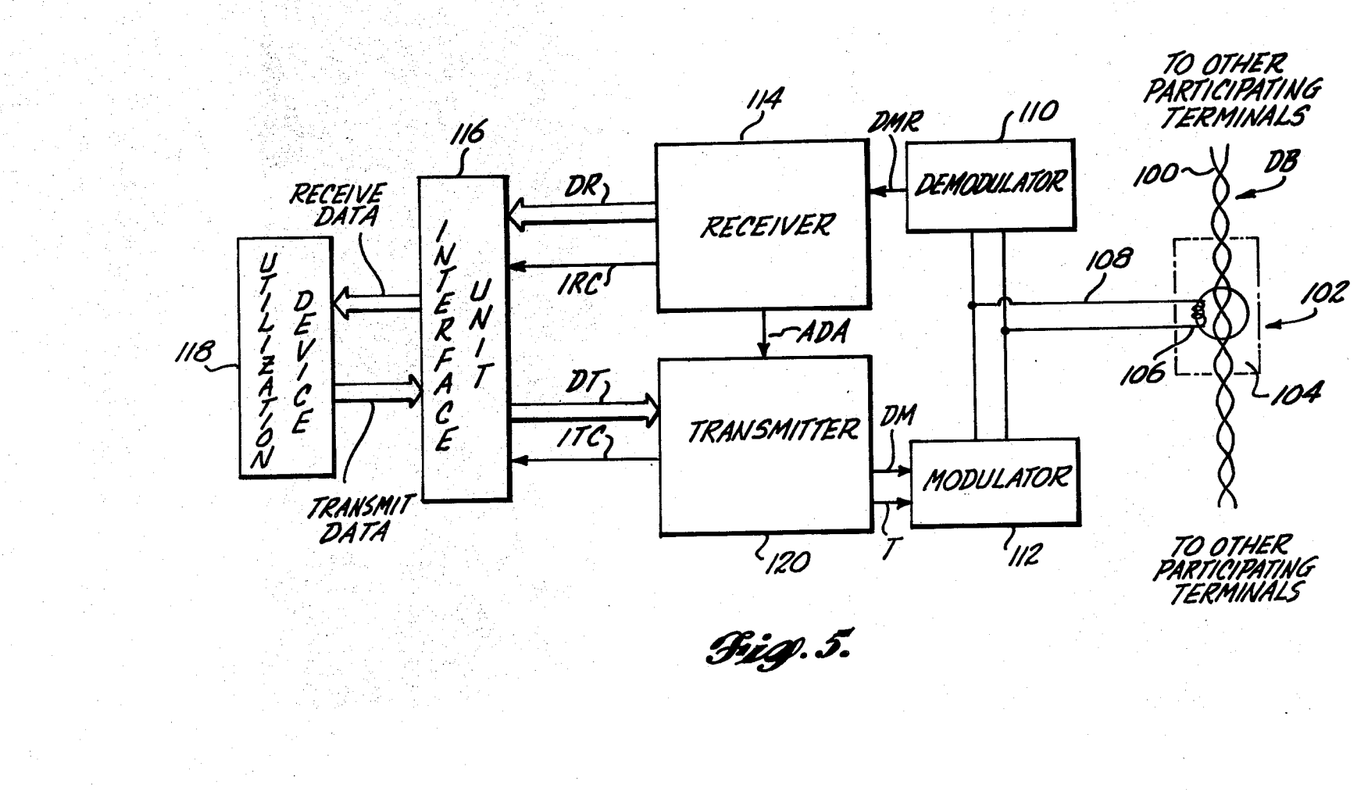
FIG. 5 is a block diagram of a simplified version of a participating terminal, and of an associated utilization device and an interface unit.

In FIG. 5, the data bus DB comprises a twisted pair of wires 100 extending to all terminals, with the terminations (not illustrated) of the twisted pair of wires 100 being short-circuited so that the data bus DB comprises a single, continuous current loop. Messages on data bus DB are in the form of currents, and are coupled to and from each transmitting terminal by an associated bus coupler 102 which includes a core 104, having separable core elements, whose legs are inserted into two adjacent loops formed by the twisted pair of wires 100 so that each wire thereof constitutes a single turn of a primary winding of the bus coupler 102. A secondary winding 106 is also wound around a core 104 and is interconnected with the transmitting terminal by a terminal stub 108 comprising a twisted pair of wires.

Within the terminal, the terminal stub 108 is connected in common to the input of a demodulator 110 and to the output of a modulator 112. The output from demodulator 110 comprises a signal DMR which represents the demodulated messages and which is applied to the input of a receiver 114 whose construction and operation will be described hereinafter with reference to FIG. 6. The outputs from receiver 114 comprise a signal ADA, which is produced upon the absence of messages upon the data bus DB, and output signals DR, which represent the data within any valid message received by the receiver 114 that is addressed to the terminal (by the label previously described). Output signals DR may be in either parallel or serial digital form. An interface unit 116 is provided for controlling the interchange of data between the terminal and its associated utilization device 118. In response to interface receive control signals IRC from receiver 114, the received data represented in output signals DR is stored in interface unit 116. Within interface unit 116, the received data is converted to any desired form and thereafter transferred to utilization device 118.

Utilization device 118 provides the data to be transmitted in an appropriate form to interface unit 116. Within interface unit 116, the data to be transmitted is stored, converted to appropriate parallel or serial digital form, and transferred as output signals DT to a transmitter 120 in response to an interface transmit control signal ITC from transmitter 120. In response to the signal ADA from receiver 114 and at times determined by the protocol that is being utilized, transmitter 120 provides an output signal DM, in serial digital form, that represents the data to be transmitted, the label or address of the terminal, and other data such as synchronizing and parity information. The signal DM and a signal T from transmitter 120 are applied to modulator 112 whose output has three distinct states. During the time that the signal T is absent, the output of modulator 112 has a high impedance so as to decouple the modulator 112 from the data bus DB. During the time that the signal T is present, signifying the transmission of a message from the terminal, the output of modulator 112 has present thereon an output signal which alternates between first and second levels in response to the signal DM, with the first and second levels being respectively positive and negative. The output signal from modulator 112 is applied directly to the input of demodulator 110, and via terminal stub 108 and bus coupler 102 to the data bus DB.

As described in more detail in U.S. Pat. No. 4,199,663, the format of each message transmission may be Manchester bi-phase level modulation, wherein successive positive and negative levels in the output signal from modulator 112 represent a "1" and successive negative and positive levels in the output signal from the modulator 112 represent a "0".

Figures 6, 7:
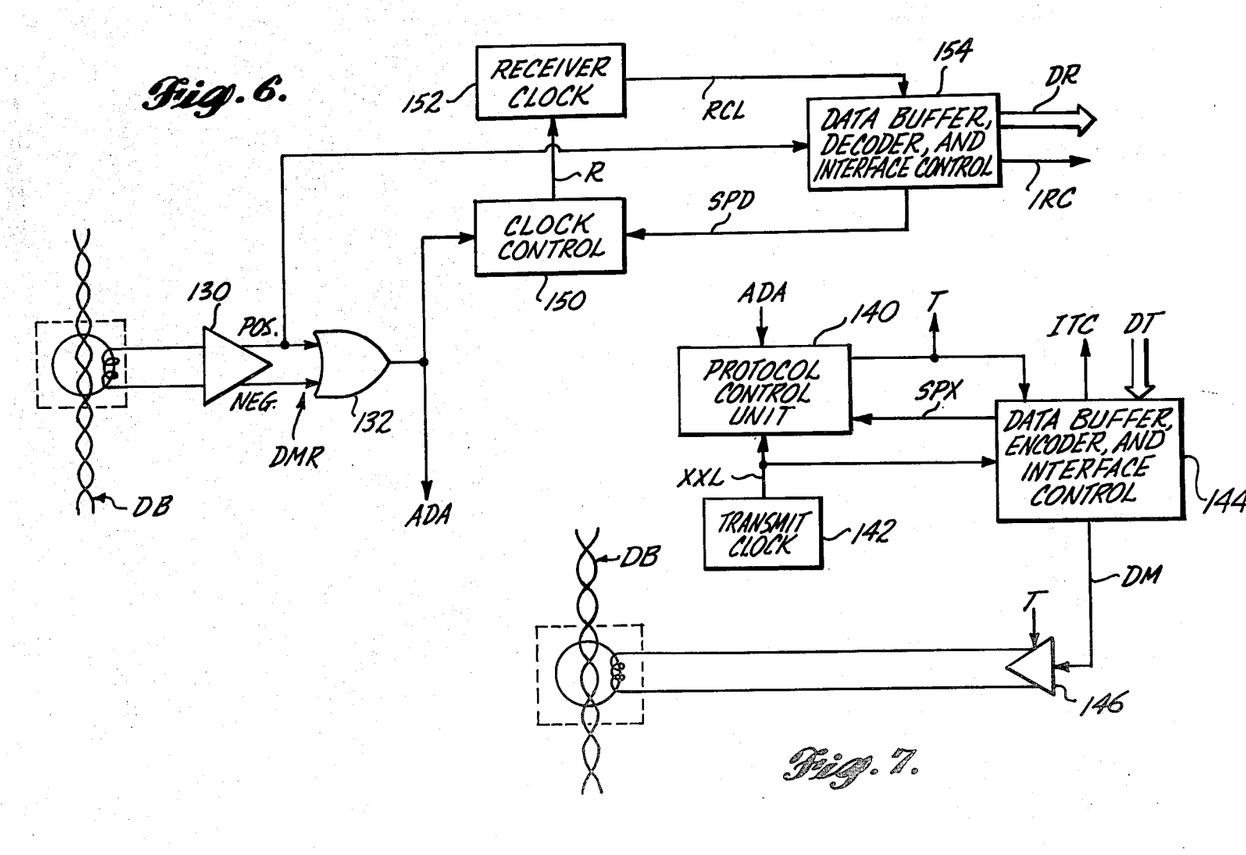
FIG. 6 is a block diagram of a demodulator and a receiver in FIG. 5.
FIG. 7 is a block diagram of a transmitter and a modulator in FIG. 5.

With reference now to FIG. 6, the demodulator 110 and receiver 114 include an amplifier 130 which provides a POS output for the duration of each positive level of the signal on data bus DB, and which provides an NEG output for the duration of each negative level of the signal on the data bus DB. At all other times, amplifier 140 provides no output. The POS and NEG outputs of amplifier 130 are applied to respective inputs of an OR gate 132 whose output comprises the signal ADA. When either the POS or NEG outputs are being provided by amplifier 130, the signal ADA is at a high logic level, signifying the presence of a message on the data bus DB. When neither the POS nor the NEG outputs from amplifier 130 are present, the signal ADA switches to a low logic level, signifying the absence of any messages on the data bus DB.

With reference now to the embodiment of modulator 112 and transmitter 120 in FIG. 7, the signal ADA is supplied to a protocol control unit 140 which also receives a transmit clock signal XXL from a transmit clock 142. Protocol control unit 140, a specific embodiment of which will be described hereinafter with reference to FIG. 8, determines if the protocol being used (which may be the A-mode protocol, the B-mode protocol or a combination thereof) has been satisfied, and, if so, supplies an output signal T to a data buffer, encoder and interface control circuit 144 and to a line driver 146 to initiate message transmission by the terminal. Previous to this time, circuit 144 will have obtained any data to be transmitted from the associated utilization device 118 through interface unit 116 by supplying signal IRC to interface unit 116 and by receiving the data to be transmitted via output signals DT, and will have encoded the data into an appropriate message format along with synchronizing, label, parity and other information. In response to signal T, the encoded message is provided to line driver 146 as signal DM which has successive first and second logic levels corresponding to the encoded information. During the time that the signal T is absent, the output from line driver 146 (which comprises the modulator 112 in FIG. 5) is tri-stated or at a high impedance. When the signal T is present, line driver 146 converts each first logic level of the signal DM from data buffer, encoder and interface control circuit 144 into a corresponding positive level, and each second logic level of signal DM into a corresponding negative level, with the output from line driver 146 being coupled to data bus DB as previously described. At the time that transmission of the message has been completed, circuit 144 supplies a signal SPX to protocol control unit 140 which responsively terminates signal T to accordingly return the output from line driver 146 to its tri-state level. Although data buffer, encoder and interface control circuit 144 may take many forms, a specific embodiment thereof useful in producing fixed-duration messages having a predetermined message format can be seen in FIG. 7 of U.S. Pat. No. 4,199,663.

Referring again to FIG. 6, the signal ADA in the receiver 114 is applied to the input of a clock control circuit 150 which may comprise an R/S flip-flop. When the signal ADA goes to a low logic level, signifying the absence of a message on the data bus, clock control circuit 150 is set to a first state in which an output signal R therefrom has a high logic level. The signal R is applied to a receiver clock 152 which is operative to provide a receiver clock signal RCL whenever the signal R has a high logic level. Both signal RCL and the POS output of amplifier 130 are applied to respective inputs of a data buffer, decoder, and interface control circuit 154 which responsively stores the information of the message that is represented by the successive levels of the signal on the POS output. Circuit 154 also decodes the message information stored therein, conducts certain tests on the synchronizing, label and parity information, and, if these tests have been satisfied, supplies the data in the message to interface unit 116 via output signals DR under control of signal IRC. When a valid and properly-addressed message has been detected by circuit 154, a signal SPD is produced thereby which sets clock control 150 to its second state, whereby signal R goes to a low logic level to disable receiver clock 152 to accordingly terminate the transfer of any further information into circuit 154. While data buffer, decoder and interface control circuit 154 may take many forms, a specific embodiment thereof useful for fixed-duration messages having a predetermined message format can be seen in FIG. 6 of U.S. Pat. No. 4,199,663.

Figure 8:
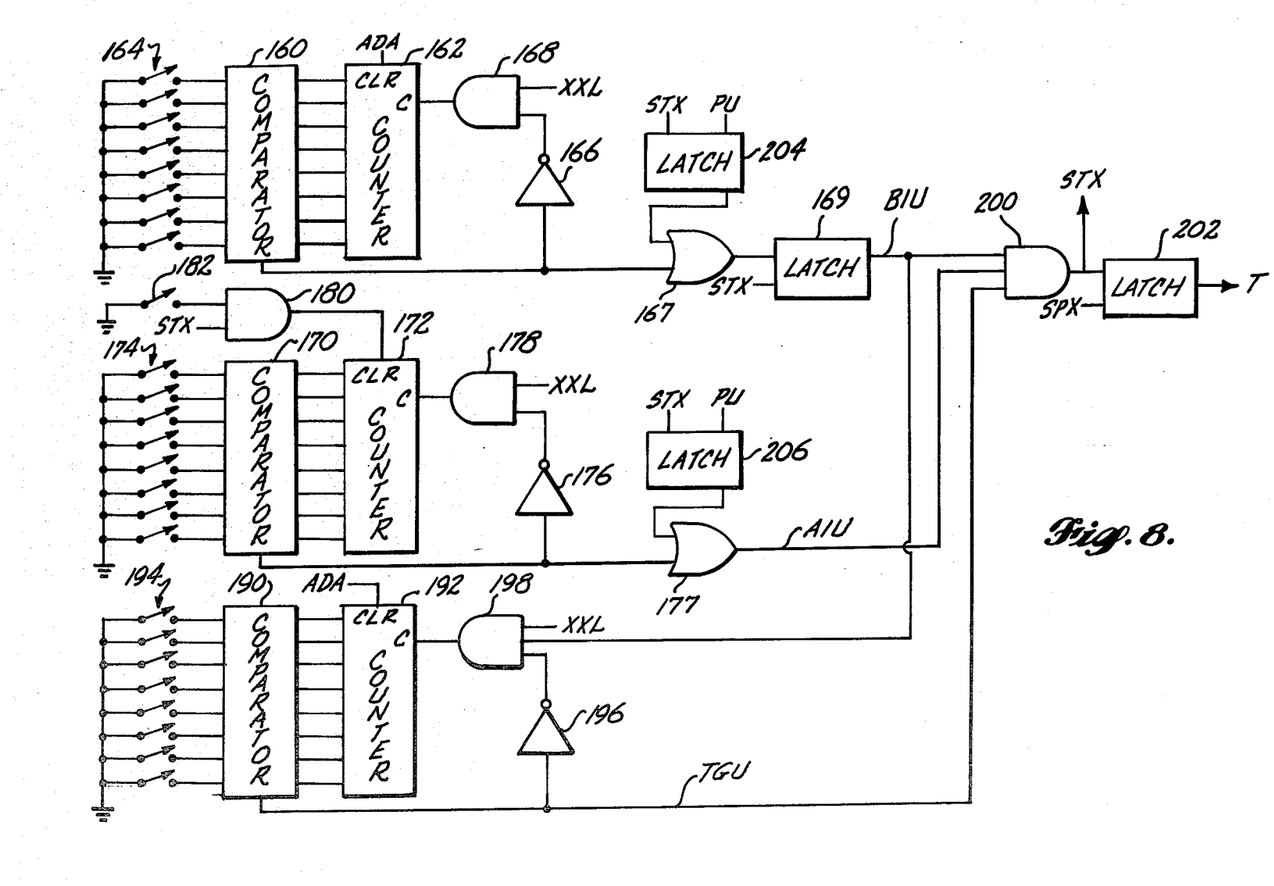
FIG. 8 is a block diagram of a protocol control unit in FIG. 7 that is particularly adapted to implement not only the aperiodic protocol illustrated in FIG. 3, but also a periodic protocol and combinations of the aperiodic and periodic protocols.

With reference now to FIG. 8, a specific embodiment of the protocol control unit 140 (FIG. 7) includes a sync gap timer, a transmission interval timer, and a terminal gap timer. The sync gap timer includes a comparator 160, a counter 162, a plurality of select switches 164, an inverting amplifier 166, and an AND gate 168; the transmission interval timer includes a comparator 170, a counter 172, a plurality of select switches 174, an inverting amplifier 176, an AND gate 178, an AND gate 180, and a switch 182; and, the terminal gap timer includes a comparator 190, a counter 192, a plurality of select switches 194, an inverting amplifier 196, and an AND gate 198.

Referring specifically to the sync gap timer, counter 162 is a multibit (e.g., eight bit) digital counter. The count within counter 162 is cleared and remains cleared whenever signal ADA (which is applied to a CLR input thereof) has a high logic level (signifying the presence of a message on the data bus), and is incremented by the output from AND gate 168 (which is applied to a clock or C input of counter 162). Comparator 160 is a multibit (e.g., eight bit) comparator that has a plurality of first inputs and a plurality of second inputs, the plurality of first inputs being connected to corresponding stages of counter 162 and the plurality of second inputs each being connected to one of the plurality of select switches 164. Comparator 160 functions to compare the count within counter 162 with a desired count, representing the duration of the sync gap, which is established by the setting of the plurality of select switches 164. The output signal from comparator 160 is applied through inverting amplifier 166 to a first input of AND gate 168 and to a set input of a latch 169 through an OR gate 167 (whose function will be described hereinafter), and the transmit clock signal XXL is applied to a second input of AND gate 168.

Let it be assumed that an absence of messages on the data bus has just occurred and that signal ADA has just gone to a low logic level. Since counter 162 previously has been cleared, the count within counter 162 does not correspond to the desired count established by select switches 164. Accordingly, the output from comparator 160 is at a low logic level, whereby AND gate 168 is enabled (through inverting amplifier 166). Thereafter, the count within counter 162 is incremented at a rate determined by the successive pulses in signal XXL. If the absence of messages on the data bus persists, e.g., signal ADA remains at a low logic level, the count within counter 162, at a time corresponding to the desired sync gap, will correspond to the desired count established by select switches 164, whereby the output signal from comparator 160 goes to a high logic level to disable AND gate 168 so that the output signal from comparator 160 is maintained at a high logic level. In response to the high logic level in the output signal from comparator 160, latch 169 is set and an output signal BIU therefrom goes to a high logic level, thereby signifying detection of the sync gap for the terminal. It will be noted that if a message appears on the data bus before expiration of the sync gap, the resultant high logic level in signal ADA clears counter 162 before the aforementioned comparison is made so that latch 169 is not set.

Referring now specifically to the terminal gap timer, counter 192 is a multibit (e.g., eight bit) digital counter whose count is cleared and remains cleared whenever signal ADA (which is applied to a CLR input thereof)

has a high logic level, and whose count is incremented by the output from AND gate 198 (which is applied to a clock or C input of counter 192). Comparator 190 is a multibit (e.g., eight bit) comparator which compares the count within counter 192 with a desired count representing the terminal gap for the terminal that is established by the setting of the plurality of select switches 194. When the two counts do not correspond, an output signal TGU from comparator 190 has a low logic level and, when the two counts do correspond, output signal TGU has a high logic level. Output signal TGU is applied through inverting amplifier 196 to a first input of AND gate 198, signal BIU (from latch 169) is applied to a second input of AND gate 198, and the transmitter clock signal XXL is applied to a third input of AND gate 198.

Let it be assumed that an absence of messages on the data bus has just occurred and that signal ADA has just gone to a low logic level. Counter 192, having previously been cleared by a high logic level in signal ADA, is thereby enabled to count but AND gate 198 remains disabled until the signal BIU goes to a high logic level, signifying detection of the sync gap as previously described. Therefore, if the sync gap has not yet been detected, counter 192 remains cleared even through signal ADA has gone to a low logic level. Since the count within counter 192 does not correspond to the desired count for the terminal gap established by select switches 194, signal TGU remains at a low logic level. Assuming that the sync gap has been detected and that signal BIU is accordingly at a high logic level, it will be seen that whenever signal ADA is at a low logic level, the count within counter 192 will be incremented at a rate determined by the successive pulses in signal XXL. If there is an absence of messages on the data bus for a time equal to the terminal gap, e.g., signal ADA remains at a low logic level for a period of time equal to the terminal gap, the count within counter 192 will correspond to the desired count representing the terminal gap and signal TGU goes to a high logic level, thereby disabling AND gate 198 so that signal TGU remains at a high logic level to signify that the terminal gap for the terminal has been detected. If, however, a message appears on the data bus before detection of the terminal gap, counter 192 is cleared in response to a high logic level in ADA and the counting operation just described repeats whenever there again is an absence of messages on the data bus.

Signal BIU, signal TGU and a signal AIU from the transmission interval timer are each supplied to respective inputs of an AND gate 200. Under the assumption that the protocol control unit is to implement only the B-mode protocol, it will be seen from the following description that signal AIU remains at a high logic level. Accordingly, when both the sync gap and the terminal gap for the terminal have been detected as represented by high logic levels in signals BIU and TGU, respectively, an output signal STX from AND gate 200 goes to a high logic level. The output signal STX is applied to the set input of a latch 202 and to the reset input of the latch 169. Whenever the protocol being implemented by the protocol control unit (e.g., the B-mode protocol) has been satisfied, the resultant high logic level in signal STX sets latch 202 which responsively provides the output signal T to enable message transmission as previously described. The high logic level in signal STX also resets latch 169, whereby signal BIU goes to a low logic level to disable AND gate 198 in the terminal gap timer, and whereby signal STX returns to a low logic level. Accordingly, once a message transmission is enabled under the B-mode protocol (through signal T), another message transmission by the terminal cannot be enabled until successive detection of the sync gap and the terminal gap for that terminal. When a message is transmitted by the terminal in response to signal T, the initiation of the message causes signal ADA to go to a high logic level, whereupon counters 162 and 192 are cleared and remain cleared until signal ADA subsequently goes to a low logic level (e.g., at the termination of the message). When message transmission has been completed by the terminal, the signal SPX (from data buffer, encoder and interface control circuit 144, FIG. 7) resets latch 202 to accordingly terminate signal T whereby the output from line driver 146 (FIG. 7) returns to its tri-state level.

In certain applications, it may be desirable to implement the A-mode protocol, or various combinations of the A-mode and B-mode protocols. To this end, the transmission interval timer includes a multibit (e.g., eight bit) counter 172 whose count is cleared and remains cleared whenever the output from AND gate 180 has a high logic level (with the output from AND gate 180 being applied to a CLR input of counter 172) and whose count is incremented by the output from AND gate 178 (which is applied to a clock or C input of counter 172). The inputs to AND gate 180 are the signal STX and that provided by switch 182. Comparator 170 is a multibit (e.g., eight bit) comparator that compares the count within counter 172 with a desired count representing the desired transmission interval that is established by the setting of the plurality of select switches 174. When the two counts do not correspond, the output signal from comparator 170 has a low logic level which, through inverting amplifier 176, enables AND gate 178 and when the two counts do correspond, the output signal from comparator 170 has a high logic level. The output signal from comparator 170 is coupled through an OR gate 177 (whose function will be described hereinafter) to an input of AND gate 200 as signal AIU.

Let it be assumed that the A-mode protocol, or a combination of the A-mode and B-mode protocols, is to be implemented. In this situation, switch 182 is opened. At the initiation of the enablement of a message transmission by the terminal, signal STX goes to a high logic level, thereby clearing counter 172. When signal STX shortly thereafter goes to a low logic level, counter 172 is enabled. If the count within counter 172 does not correspond to the desired count representing the transmission interval established by select switches 174, the output signal from comparator 170 is at a low logic level, whereby AND gate 178 is enabled so that the count within counter 172 is thereafter incremented at a rate determined by the successive pulses in signal XXL. It should be noted that the count within counter 172 is incremented irrespective of the absence or presence of messages on the data bus. After expiration of the transmission interval, the two counts correspond, whereby the output signal from comparator 170 and signal AIU both go to a high logic level, thereby disabling AND gate 178 to maintain signal AIU at a high logic level. When signal AIU has a high logic level, and assuming that the signals BIU and TGU have a high logic level, it will be seen that signal STX from AND gate 200 goes to a high logic level, thereby setting latch 202 to enable message transmission by the terminal (through signal T) and also clearing counter 172 (through AND gate 180).

It will be seen that the embodiment of protocol control unit 140 in FIG. 8 can be used to implement only the A-mode protocol, only the B-mode protocol, or a combination of the A-mode and B-mode protocols. To implement only the A-mode protocol, select switches 164 are all closed, whereby the desired count representing the sync gap is zero, switch 182 is opened, and select switches 174 and 194 are set to represent desired counts for the transmission interval (whose duration is substantially the same for all terminals) and for the terminal gap (whose duration is unique to the terminal). Since the desired count established by select switches 164 is now zero, it will be seen that the output signal from comparator 160 remains at all times at a high logic level so that latch 169 remains set at all times. Accordingly, signal BIU remains at a high logic level, so that enablement of the initiation of message transmission (through a high logic level in signal STX) is made only upon the occurrence of both expiration of the transmission interval from a previous transmission by the terminal (represented by a high logic level in signal AIU) and the expiration of the terminal gap (represented by a high logic level in signal TGU).

To implement only the B-mode protocol, either switch 182 may be closed or select switches 174 may be all closed, and select switches 164 and 194 are set to represent a desired sync gap (which is common to all terminals) and a desired terminal gap for the terminal (which is unique to the terminal). Since the desired count established by select switches 174 is now zero or since counter 172 cannot be cleared by signal STX (since AND gate 180 is disabled), signal AIU remains at a high logic level so that enablement of the initiation of message transmission is made only upon the occurrence of the expiration of the sync gap (represented by a high logic level in signal BIU) and the successive expiration of the terminal gap (represented by a high logic level in signal TGU).

To implement a combination of the A-mode and B-mode protocols, switch 182 is opened and select switches 164, 174 and 194 are set to represent, respectively, a desired sync gap, a desired transmission interval, and a desired terminal gap. In this combined protocol, the terminal gap assigned to each unit must be unique, and the durations of the sync gap and of the transmission interval must be common to all terminals. The relative durations of the sync gap and of the transmission interval, along with the number of transmitting terminals and the message durations from such transmitting terminals, determine whether successive message transmissions from any terminal will be periodic (A-mode) or aperiodic (B-mode) as can be seen from the timing diagrams of FIGS. 9A and 9B.

Let it be assumed that the data communications system includes terminals $TL_1$-$TL_5$ (reference FIG. 1), that the terminal gaps $tg_1$-$tg_5$ associated with the terminals have a predetermined relationship ($tg_1 < tg_2 < tg_3 < tg_4 < tg_5$), that the sync gap is greater than the longest terminal gap, e.g., $tg_5$, and that the transmission interval is longer in duration than the sync gap but shorter than the sum of all messages, terminal gaps, and the sync gap in a situation where all terminals are engaged in message transmissions.

Figure 9A:
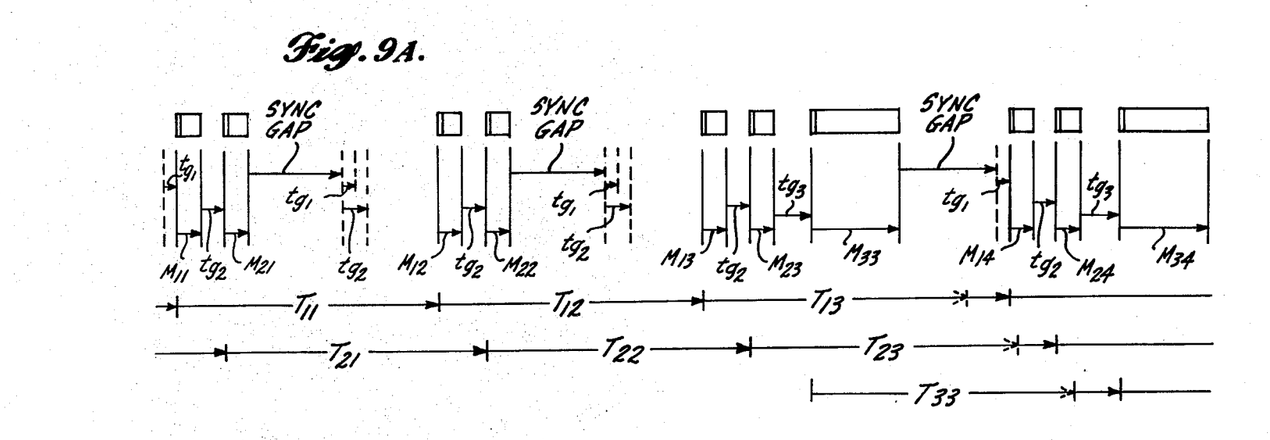
FIGS. 9A and 9B are timing diagrams illustrating the operation of the data communications system in which the participating terminals each include a protocol control unit of the type in FIG. 7.

In FIG. 9A, let it be assumed that terminals $TL_1$ and $TL_2$ are the only "active" terminals engaging in message transmissions and that the remaining terminals $TL_3$-$TL_5$ are "inactive" and deenergized. At the initiation of message $M_{11}$, the latch 169 in terminal $TL_1$ is reset to disable the terminal gap timer therein and the transmission interval timer therein is also reset (by clearing the counter 172 as previously described) to initiate transmission interval $T_{11}$. At the initiation of message $M_{21}$, the latch 169 in terminal $TL_2$ is reset to disable the terminal gap timer therein and the transmission interval timer therein is also reset (by clearing the counter 172 as previously described) to initiate transmission interval $T_{21}$. During each of the messages $M_{11}$ and $M_{21}$, the sync gap timers in terminals $TL_1$ and $TL_2$ are reset.

Following the termination of message $M_{21}$, there is an absence of messages on the data bus for a time substantially equal to the sync gap. Upon expiration of the sync gap, the output signal from each of the sync gap timers goes to a high logic level so that the latches 169 in terminals $TL_1$ and $TL_2$ are set. As a result, the signal BIU in each of the terminals goes to a high logic level, thereby enabling each of the terminal gap timers (through the associated AND gate 198). Following this time, there is still an absence of messages on the data bus. Upon expiration of terminal gap $tg_1$ (following expiration of the sync gap), the signal TGU in terminal $TL_1$ goes to a high logic level. However, because transmission interval $T_{11}$ has not yet expired, signal AIU in terminal $TL_1$ remains at a low logic level. Upon expiration of terminal gap $tg_2$ (following expiration of the sync gap), the signal TGU in terminal $TL_2$ also goes to a high logic level. However, because transmission interval $T_{21}$ has not yet expired, signal AIU in terminal $TL_2$ remains at a low logic level. At a subsequent time, transmission interval $T_{11}$ expires and the signal AIU in terminal $TL_1$ goes to a high logic level. At this time, each of the signals BIU, AIU and TGU in terminal $TL_1$ is at a high logic level, whereupon signal STX therein goes to a high logic level to set the latch 202 therein, to reset the latch 169 therein, and to reset the transmission interval timer therein to initiate transmission interval $T_{12}$. In response to signal T, terminal $TL_1$ initiates transmission of message $M_{12}$, whereby the sync gap timers and terminal gap timers in terminals $TL_1$ and $TL_2$ are reset. At the termination of message $M_{12}$, the terminal gap timer in terminal $TL_1$ is disabled since signal BIU therein is at low logic level (due to the resetting of the latch 169). However, the terminal gap timer in terminal $TL_2$ remains enabled. After an absence of messages on the data bus substantially equal to terminal gap $tg_2$, the signal TGU in terminal $TL_2$ goes to a high logic level. At about this time, transmission interval $T_{21}$ also expires, whereby signal AIU in terminal $TL_2$ also goes to a high logic level. At this time, each of the signals BIU, AIU and TGU in terminal $TL_2$ is at a high logic level so that signal STX therein goes to a high logic level to set the latch 202 therein, to reset the latch 169 therein, and to reset the transmission interval timer therein to initiate transmission interval $T_{22}$. In response to signal T, terminal $TL_2$ initiates transmission of message $M_{22}$ which resets the sync gap timers and terminal gap timers in terminals $TL_1$ and $TL_2$.

Following termination of message $M_{22}$, the operation of the system proceeds in a manner similar to that just described. After expiration of the sync gap the latches 169 in terminals $TL_1$ and $TL_2$ are set, terminal $TL_1$ initiates transmission of message $M_{13}$ upon the expiration of terminal gap $tg_1$ and of transmission interval $T_{12}$ (whereby transmission interval $T_{13}$ is initiated), and terminal $TL_2$ initiates transmission of message $M_{23}$ upon expiration of terminal gap $tg_2$ and of transmission interval $T_{22}$ (whereupon transmission interval $T_{23}$ is initiated).

During the transmission of message $M_{23}$, terminal $TL_3$ is energized so that terminal $TL_3$ is ready to engage in message transmissions at the termination of message $M_{23}$. With reference again to FIG. 8, the output signals from latches 204 and 206 are applied to second inputs of OR gates 167 and 177, respectively. Latches 204, 206 are set (whereby the output signals therefrom go to a high logic level) in response to a high logic level in a signal PU applied thereto, and are reset (whereby the output signals therefrom go to a low logic level) in response to a high logic level in signal STX. Whenever the terminal is energized, signal PU is caused to go to a high logic level for a short period of time (by means not illustrated), whereby latches 204 and 206 are set. The resultant high logic level in the output signal from latch 204 sets latch 169 (through OR gate 167) so that signal BIU goes to a high logic level, thereby signifying "detection" of the sync gap and also enabling the terminal gap timer in the terminal. The high logic level in the output signal from latch 206 causes signal AIU (through OR gate 177) to go to a high logic level, thereby signifying "detection" of the transmission interval for the terminal.

Returning to FIG. 9A, it will be noted that, at the termination of message $M_{23}$, the latches 169 in terminals $TL_1$ and $TL_2$ are reset and the latch 169 in terminal $TL_3$ is set, so that the terminal gap timers in terminals $TL_1$ and $TL_2$ are disabled and the terminal gap timer in terminal gap $TL_3$ is enabled. The transmission interval timers in terminals $TL_1$ and $TL_2$ are timing (since transmission intervals $T_{13}$ and $T_{23}$ have not yet expired), and expiration of the transmission interval for terminal $TL_3$ has been "detected", e.g., the signal AIU in terminal $TL_3$ is at a high logic level. Following the termination of message $M_{23}$, there is an absence of messages on the data bus. Upon expiration of terminal gap $tg_3$, the signal TGU in terminal $TL_3$ goes to a high logic level. At this time, each of the signals BIU, AIU and TGU in terminal $TL_3$ is at a high logic level, whereupon signal STX therein goes to a high logic level to set the latch 202 therein, to reset each of the latches 169, 204 and 206 therein, and to reset the transmission interval timer therein to initiate transmission interval $T_{33}$. In response to signal T, terminal $TL_3$ initiates transmission of message $M_{33}$, whereby the sync gap timers and terminal gap timers in terminals $TL_1$, $TL_2$ and $TL_3$ are reset. At the termination of message $M_{33}$, the terminal gap timers in terminals $TL_1$, $TL_2$ and $TL_3$ are disabled since the latches 169 in each of these terminals are reset. Following the termination of message $M_{33}$, there is an absence of messages on the data bus. At successively later times from the termination of message $M_{33}$, transmission intervals $T_{13}$ and $T_{23}$ expire so that the signals AIU in terminals $TL_1$ and $TL_2$ go to and remain at a high logic level. However, no message transmissions can be made by terminals $TL_1$ and $TL_2$ at these times since the latches 169 therein are reset, signifying that the sync gap has not yet been detected.

Upon expiration of the sync gap (following termination of message $M_{33}$), the output signal from each of the sync gap timers goes to a high logic level so that the latch 169 in each of the terminals $TL_1$, $TL_2$ and $TL_3$ is set. As a result, the signal BIU in each of the terminals goes to a high logic level, thereby enabling each of the terminal gap timers. Upon expiration of terminal gap $tg_1$ (following expiration of the sync gap), the signal TGU in terminal $TL_1$ goes to a high logic level. At this time, each of the signals BIU, AIU and TGU in terminal $TL_1$ is at a high logic level, whereby terminal $TL_1$ initiates transmission of message $M_{14}$ and, in doing so, resets the latch 169 therein and resets the transmission interval timer therein to initiate a succeeding transmission interval. Following termination of message $M_{14}$, terminal gap $tg_2$ expires, whereupon terminal $TL_2$ initiates transmission of message $M_{24}$ and, in doing so, resets the latch 169 therein and resets the transmission interval timer therein to initiate a succeeding transmission interval. At about the initiation of message $M_{24}$, transmission interval $T_{33}$ expires. Although the signals BIU and AIU in terminal $TL_3$ are therefore at a high logic level, the signal TGU therein is not since terminal gap $tg_3$ has not yet expired so that terminal $TL_3$ is not able to transmit a message at this time. At the expiration of terminal gap $tg_3$ following termination of message gap $M_{24}$, each of the signals BIU, AIU and TGU in terminal $TL_3$ is at a high logic level, whereupon terminal $TL_3$ initiates transmission of message $M_{34}$ and, in doing so, resets the latch 169 therein and resets the transmission interval timer therein to initiate a successive transmission interval. Thereafter, the operation of the system proceeds in a similar manner.

Figure 9B:
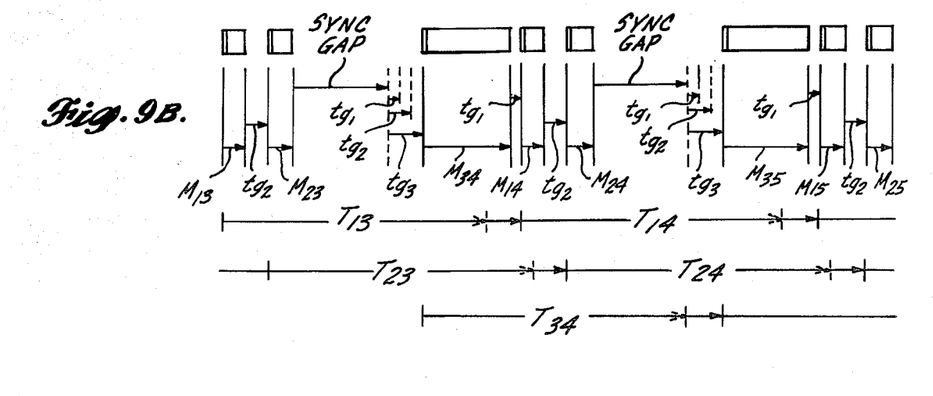

Referring now to FIG. 9B, let it be assumed that the system has operated in a manner identical to that previously described with reference to FIG. 9A up through termination of message $M_{23}$. Let it also be assumed that when terminal $TL_3$ is energized, the latch 169 therein is reset (by means not illustrated in FIG. 8 instead of being set by latch 204 as previously described) and that latch 206 is set as previously described. As a result, the signals BIU and TGU in terminal $TL_3$ are each at a low logic level, the terminal gap timer in terminal $TL_3$ is disabled, and the signal AIU therein is at a high logic level. Following termination of message $M_{23}$, there is an absence of messages on the data bus. Upon expiration of the sync gap, the latches 169 in the terminals are set, thereby enabling each of the terminal gap timers. Upon expiration of terminal gap $tg_1$ (following expiration of the sync gap), the signal TGU in terminal $TL_1$ goes to a high logic level. However, because transmission interval $T_{13}$ has not yet expired, signal AIU in terminal $TL_1$ remains at a low logic level. Upon the expiration of terminal gap $tg_2$ (following expiration of the sync gap), the terminal gap TGU in terminal $TL_2$ also goes to a high logic level. However, because the transmission interval $T_{23}$ has not yet expired, signal AIU in terminal $TL_2$ remains at a low logic level. Upon the expiration of terminal gap $tg_3$ (following expiration of the sync gap) the signal TGU in terminal $TL_3$ goes to a high logic level. At this time, each of the signals BIU, AIU and TGU in terminal $TL_3$ is at a high logic level, whereupon terminal $TL_3$ initiates transmission of message $M_{34}$ and, in doing so, resets the latch 169 therein to accordingly disable the terminal gap timer therein, resets the latch 206 therein, and resets the transmission interval timer therein to initiate transmission interval $T_{34}$.

During the transmission of message $M_{34}$, transmission intervals $T_{13}$ and $T_{23}$ successively expire. However, since the terminal gap timers in terminals $TL_1$ and $TL_2$ have been reset during message $M_{34}$, terminals $TL_1$ and $TL_2$ cannot transmit messages at these times. At the termination of message $M_{34}$, the latches 169 in terminals $TL_1$ and $TL_2$ remain set so that the terminal gap timers therein are enabled. Upon the expiration of terminal gap $tg_1$, each of the signals BIU, AIU and TGU in terminal $TL_1$ is at a high logic level, whereupon terminal $TL_1$ initiates transmission of message $M_{14}$ and, in doing so, resets the latch 169 therein and resets the transmission interval timer therein to initiate transmission interval $T_{14}$. Upon the expiration of terminal gap $tg_2$ following termination of message $M_{14}$, each of the signals BIU, AIU and TGU in terminal $TL_2$ is at a high logic level, whereupon terminal $TL_2$ initiates transmission of message $M_{24}$ and, in doing so, resets the latch 169 therein and resets the transmission interval timer therein to initiate transmission interval $T_{24}$.

Following termination of message $M_{24}$, there is an absence of messages on the data bus. At a time before expiration of the sync gap (following termination of message $M_{24}$), transmission interval $T_{34}$ expires but no message transmission is made by terminal $TL_3$ since the latch 169 therein is reset. Upon the expiration of the sync gap, the latches 169 in terminals $TL_1$, $TL_2$ and $TL_3$ are set so that each of the terminal gap timers is enabled. Upon the expiration of terminal gap $tg_1$ (following expiration of the sync gap), the signal TGU in terminal $TL_1$ goes to a high logic level. However, because transmission interval $T_{14}$ has not yet expired, signal AIU in terminal $TL_1$ remains at a low logic level. Upon the expiration of terminal gap $tg_2$ (following expiration of the sync gap), the signal TGU in terminal $TL_2$ also goes to a high logic level. However, because transmission interval $T_{24}$ has not yet expired, signal AIU in terminal $TL_2$ remains at a low logic level. Upon the expiration of terminal gap $tg_3$ (following expiration of the sync gap), the signal TGU in terminal $TL_3$ goes to a high logic level. At this time, each of the signals BIU, AIU and TGU in terminal $TL_3$ is at a high logic level, whereupon terminal $TL_3$ initiates transmission of message $M_{35}$ and, in doing so, resets the latch 169 therein and resets the transmission interval timer therein to initiate a successive transmission interval. Transmission intervals $T_{14}$ and $T_{24}$ expire during message $M_{35}$, so that terminal $TL_1$ initiates transmission of message $M_{15}$ upon expiration of terminal gap $tg_1$ following termination of message $M_{35}$, and terminal $TL_2$ initiates transmission of message $M_{25}$ upon expiration of terminal gap $tg_2$ following termination of message $M_{15}$.

From FIG. 9A, it will be noted that the initial message transmissions by terminals $TL_1$ and $TL_2$ are periodic, that is, the interval between messages $M_{11}$ and $M_{12}$, the interval between messages $M_{12}$ and $M_{13}$, the interval between messages $M_{21}$ and $M_{22}$ and the interval between messages $M_{22}$ and $M_{23}$ are each substantially equal in duration. Therefore, the initial portion of the timing diagram in FIG. 9 illustrates a use of the data communication system in which message transmissions are under control of the A-mode protocol. However, due to the fact that terminal $TL_3$ transmitted message $M_{33}$ following messages $M_{13}$ and $M_{23}$, it will be noted that the later messages from terminals $TL_1$ and $TL_2$ become aperiodic with respect to the earlier messages, that is, the interval between messages $M_{13}$ and $M_{14}$ is greater than the interval between messages $M_{12}$ and $M_{13}$ and the interval between messages $M_{23}$ and $M_{24}$ is greater than the interval between messages $M_{22}$ and $M_{23}$. Therefore, the final portion of the timing diagram in FIG. 9A illustrates a use of the data communications system in which message transmissions are under control of the B-mode protocol.

Through a comparison of FIGS. 9A and 9B, it will also be noted that signifying "detection" of the sync gap (FIG. 9A) or not signifying "detection" of the sync gap (FIG. 9B) in a terminal that has just been energized affects not only the actual time at which the first message transmission from the newly-active terminal is permitted but also the order and rate of successive message transmissions by all active terminals thereafter. In both situations, it will be noted that the transmission interval timer in each terminal loses control over the rate of message transmissions by that terminal, so that successive message transmissions can be made only upon expiration of the sync gap and the terminal gap for that terminal. By the use of such a combined protocol, it also can be seen that the rate of message transmissions by any terminal can be limited to a rate determined by the transmission interval, while yet permitting the data communications system to accommodate variable-length messages and/or message transmissions by additional terminals.

While the invention has been described with reference to a preferred embodiment, it is to be clearly understood by those skilled in the art that the invention is not limited thereto. Rather, the scope of the invention is to be interpreted only in conjunction with the appended claims.

The embodiments of the invention in which an exclusive property or privilege is claimed are:

1. An improved method which permits each of a plurality of terminals to autonomously transmit messages on a data communications medium, said method comprising the steps, at each said terminal, of:
 detecting the absence of messages on said data communications medium; and,
 enabling transmission of a message by said terminal only upon (i) the detection of an absence of messages on said data communications medium whose duration substantially equals that of a sync gap that is common to all of said plurality of terminals, and (ii) the subsequent detection of an absence of messages on the data communications medium whose duration substantially equals that of a terminal gap that is unique to said terminal, with the duration of said sync gap being greater than the duration of any said terminal gap.

2. A method as recited in claim 1, wherein the transmission of a message by said terminal is enabled only when a transmission interval, from a previous transmission of a message by said terminal, has also elapsed, said transmission interval having a predetermined duration which is substantially the same for all of said plurality of terminals.

3. A method as recited in claim 2, wherein the duration of said transmission interval is greater than that of said sync gap.

4. A method as recited in claims 1 or 2, wherein successive messages transmitted by each said terminal have variable durations.

5. A method as recited in claims 1 or 2, wherein successive messages transmitted by each said terminal have fixed durations.

6. A method as recited in claims 1 or 2, wherein the messages transmitted by said plurality of terminals have equal durations.

7. A method as recited in claims 1 or 2, wherein the messages transmitted by said plurality of terminals have unequal durations.

8. A method as recited in claims 1 or 2, wherein a message transmitted by at least one of said plurality of terminals consists of a plurality of successive message words separated in time by interword gaps, and wherein each said terminal gap has a duration that is greater than that of each said interword gap.

9. A method as recited in claims 1 or 2, wherein each said message is in the form of at least one serial, digital data word transmitted on said data communications medium.

10. A method as recited in claim 9, wherein said data communications medium is a data bus.

11. A data communications system comprising: a data communications medium; and, a plurality of terminals coupled to said data communications medium, each said terminal including: first means for providing a first output signal in response to an absence of messages on said data communications medium whose duration substantially equals that of a sync gap common to said plurality of terminals; second means enabled by said first output signal for providing a second output signal in response to an absence of messages on said data communications medium whose duration substantially equals that of a terminal gap unique to said terminal, the duration of said sync gap being greater than that of any said terminal gap; and, transmitting means enabled by said first and said second output signals for transmitting a message on said data communications medium.

12. A system as recited in claim 11, wherein each said terminal also includes third means for providing a third output signal at the elapse of a predetermined transmission interval from a previous message transmission by said terminal, the duration of said transmission interval being substantially the same for each of said plurality of terminals; and, wherein said transmitting means is enabled only by said first, second and third output signals.

13. A system as recited in claims 11 or 12, wherein each said terminal also includes receiving means for receiving messages transmitted on said data communications medium.

14. A system as recited in claim 13, wherein each said terminal is adapted to exchange information with an associated utilization device, and wherein each said terminal further includes interface means for transferring messages received by said receiving means to the utilization device and for transferring messages to be transmitted from the utilization device to said transmitting means.

15. A system as recited in claims 11 or 12, wherein said transmitting means is operative to transmit said messages in the form of serial, digital data words.

16. A system as recited in claim 15, wherein said data communications medium comprises a data bus.

17. A terminal which is capable of autonomous access, along with other terminals, to a data bus for the purpose of transmitting and receiving messages on the data bus, said terminal comprising:
(a) a receiver adapted to be coupled to the data bus for receiving messages on the data bus, said receiver providing a message absent signal during the absence of messages on the data bus;
(b) a transmitter adapted to be coupled to the data bus, for transmitting, when enabled, a message on the data bus; and
(c) a protocol control unit coupled to said receiver and to said transmitter, said protocol control unit including:

a resettable sync gap timer adapted to time said message absent signal and to provide a sync gap detection signal when said message absent signal has a predetermined duration substantially equal to a sync gap common to each terminal accessing the data bus, said sync gap timer being reset whenever said message absent signal terminates;
latch means for temporarily storing said sync gap detection signal;
a resettable terminal gap timer which is enabled in response to said sync gap detection signal and which is adapted, when enabled, to time said message absent signal and to provide a terminal gap detection signal when said message absent signal has a predetermined duration substantially equal to a terminal gap unique to said terminal, said terminal gap timer being reset whenever said message absent signal terminates; and,
gating means for enabling said transmitter and for resetting said latch means in response to said sync gap detection signal and said terminal gap detection signal.

18. A terminal as recited in claim 17, wherein said protocol control unit further includes: a resettable transmission interval timer which is operative to provide a transmission interval detection signal at the elapse of a predetermined transmission interval following reset of said transmission interval timer, said transmission interval having substantially the same duration for each terminal accessing the data bus; and, wherein said gating means is further operative to enable said transmitter, to reset said latch means, and to reset said transmission interval timer only in response to said sync gap detection signal, said terminal gap detection signal, and said transmission interval detection signal.

19. A terminal as recited in claims 17 or 18, wherein said sync gap timer further includes means for selectively adjusting the duration of said sync gap.

20. A terminal as recited in claims 17 or 18, wherein said terminal gap timer includes means for selectively adjusting the duration of said terminal gap.

21. A terminal as recited in claims 17 or 18, wherein said terminal is particularly adapted for use with a data bus comprising an elongated, twisted pair of conductors having short-circuit terminations, and further comprising means for inductively coupling said receiver and said transmitter to the twisted pair of conductors.

22. A terminal as recited in claim 18, wherein said transmission interval timer includes means for selectively adjusting the duration of said transmission interval.

23. A terminal as recited in claim 18, wherein said protocol control unit further includes means for selectively disabling reset of said transmission interval timer and for causing said transmission interval timer to provide said transmission interval detection signal when reset thereof has been disabled.

24. A terminal as recited in claim 18, wherein said protocol control unit further includes means for causing said transmission interval timer to provide said transmission interval detection signal upon application of power to said terminal.

25. A terminal as recited in claims 18 or 24, wherein said protocol control unit further includes means for causing said sync gap timer to provide said sync gap detection signal upon application of power to said terminal.

* * * * *

UNITED STATES PATENT AND TRADEMARK OFFICE
CERTIFICATE OF CORRECTION

PATENT NO. : 4,471,481

DATED : September 11, 1984

INVENTOR(S) : John L. Shaw et al.

It is certified that error appears in the above-identified patent and that said Letters Patent is hereby corrected as shown below:

Title page:

| | |
|---|---|
| Abstract, | line 2: insert -- ( -- (bracket) before "$TL_1$-$TL_5$" |
| | line 20: "termial" should be --terminal-- |
| Column 3, | line 6: delete "of" after "upon" |
| | line 7: insert --the detection of-- after "(i)" |
| | line 7: delete "the detection" after "absence" |
| Column 5, | line 24: "accomodate" should be --accommodate-- |
| | line 52: "communication" should be --communications-- |
| Column 7, | line 35: "ae" should be --are-- |
| Column 8, | line 65: "accomodate" should be --accommodate-- |
| Column 10, | line 54: "an" should be --a-- |
| Column 13, | line 25: "through" should be --though-- |

Signed and Sealed this

Sixteenth Day of April 1985

[SEAL]

Attest:

DONALD J. QUIGG

Attesting Officer

Acting Commissioner of Patents and Trademarks